(12) United States Patent
Huebner et al.

(10) Patent No.: US 10,189,414 B1
(45) Date of Patent: Jan. 29, 2019

(54) VEHICLE STORAGE ASSEMBLY

(71) Applicant: Ford Global Technologies, LLC, Dearborn, MI (US)

(72) Inventors: Annette Lynn Huebner, White Lake, MI (US); Stuart C. Salter, White Lake, MI (US); Scott Holmes Dunham, Redford, MI (US); Pietro Buttolo, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/794,325

(22) Filed: Oct. 26, 2017

(51) Int. Cl.
| | |
|---|---|
| *B60R 7/04* | (2006.01) |
| *B60Q 3/82* | (2017.01) |
| *F21V 9/08* | (2018.01) |
| *B60Q 3/62* | (2017.01) |
| *B60Q 3/225* | (2017.01) |
| *B60R 11/00* | (2006.01) |

(52) U.S. Cl.
CPC ............... *B60R 7/04* (2013.01); *B60Q 3/225* (2017.02); *B60Q 3/62* (2017.02); *B60Q 3/82* (2017.02); *F21V 9/08* (2013.01); *B60R 2011/0007* (2013.01)

(58) Field of Classification Search
CPC ..... B60R 7/04; B60R 2011/0007; B60Q 3/82; B60Q 3/225
USPC .............................................. 296/24.34, 37.8
See application file for complete search history.

(56) References Cited

U.S. PATENT DOCUMENTS

| | | |
|---|---|---|
| 2,486,859 A | 11/1949 | Meijer et al. |
| 5,053,930 A | 10/1991 | Benavides |
| 5,434,013 A | 7/1995 | Fernandez |
| 5,709,453 A | 1/1998 | Krent et al. |
| 5,839,718 A | 11/1998 | Hase et al. |
| 6,031,511 A | 2/2000 | DeLuca et al. |
| 6,117,362 A | 9/2000 | Yen et al. |
| 6,294,990 B1 | 9/2001 | Knoll et al. |
| 6,419,854 B1 | 7/2002 | Yocom et al. |
| 6,494,490 B1 | 12/2002 | Trantoul |
| 6,577,073 B2 | 6/2003 | Shimizu et al. |
| 6,729,738 B2 | 5/2004 | Fuwausa et al. |
| 6,737,964 B2 | 5/2004 | Samman et al. |
| 6,773,129 B2 | 8/2004 | Anderson, Jr. et al. |
| 6,820,888 B1 | 11/2004 | Griffin |
| 6,851,840 B2 | 2/2005 | Ramamurthy et al. |
| 6,859,148 B2 | 2/2005 | Miller |
| 6,871,986 B2 | 3/2005 | Yamanaka et al. |
| 6,942,267 B1 | 9/2005 | Sturt |
| 6,953,536 B2 | 10/2005 | Yen et al. |
| 6,990,922 B2 | 1/2006 | Ichikawa et al. |

(Continued)

FOREIGN PATENT DOCUMENTS

| | | |
|---|---|---|
| CN | 101337492 A | 1/2009 |
| CN | 201169230 Y | 2/2009 |

(Continued)

*Primary Examiner* — Gregory A Blankenship
(74) *Attorney, Agent, or Firm* — Vichit Chea; Price Heneveld LLP

(57) ABSTRACT

A storage assembly is provided herein. The storage assembly includes a console housing defined by a plurality of surfaces. A member extends along at least one of the plurality of surfaces and is movable along the console housing between a closed position and an open position. The member defines a storage compartment in the open position.

16 Claims, 12 Drawing Sheets

(56) References Cited

U.S. PATENT DOCUMENTS

| | | | |
|---|---|---|---|
| 7,015,893 B2 | 3/2006 | Li et al. |
| 7,161,472 B2 | 1/2007 | Strumolo et al. |
| 7,213,923 B2 | 5/2007 | Liu et al. |
| 7,216,997 B2 | 5/2007 | Anderson, Jr. |
| 7,249,869 B2 | 7/2007 | Takahashi et al. |
| 7,264,366 B2 | 9/2007 | Hulse |
| 7,264,367 B2 | 9/2007 | Hulse |
| 7,347,576 B2 | 3/2008 | Wang et al. |
| 7,407,210 B2 | 8/2008 | Arbaugh et al. |
| 7,441,914 B2 | 10/2008 | Palmer et al. |
| 7,501,749 B2 | 3/2009 | Takeda et al. |
| 7,575,349 B2 | 8/2009 | Bucher et al. |
| 7,635,212 B2 | 12/2009 | Seidler |
| 7,726,856 B2 | 6/2010 | Tsutsumi |
| 7,745,818 B2 | 6/2010 | Sofue et al. |
| 7,753,541 B2 | 7/2010 | Chen et al. |
| 7,770,954 B2 | 8/2010 | D'Alessandro |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,044,415 B2 | 10/2011 | Messere et al. |
| 8,066,416 B2 | 11/2011 | Bucher |
| 8,071,988 B2 | 12/2011 | Lee et al. |
| 8,097,843 B2 | 1/2012 | Agrawal et al. |
| 8,118,441 B2 | 2/2012 | Hessling |
| 8,120,236 B2 | 2/2012 | Auday et al. |
| 8,136,425 B2 | 3/2012 | Bostick |
| 8,163,201 B2 | 4/2012 | Agrawal et al. |
| 8,169,131 B2 | 5/2012 | Murazaki et al. |
| 8,178,852 B2 | 5/2012 | Kingsley et al. |
| 8,196,985 B2 | 6/2012 | Penner et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,261,686 B2 | 9/2012 | Birman et al. |
| 8,286,378 B2 | 10/2012 | Martin et al. |
| 8,317,329 B2 | 11/2012 | Seder et al. |
| 8,317,359 B2 | 11/2012 | Harbers et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,459,832 B2 | 6/2013 | Kim |
| 8,466,438 B2 | 6/2013 | Lambert et al. |
| 8,505,997 B2 | 8/2013 | Hipshier et al. |
| 8,519,359 B2 | 8/2013 | Kingsley et al. |
| 8,519,362 B2 | 8/2013 | Labrot et al. |
| 8,539,702 B2 | 9/2013 | Li et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,653,553 B2 | 2/2014 | Yamazaki et al. |
| 8,664,624 B2 | 3/2014 | Kingsley et al. |
| 8,683,722 B1 | 4/2014 | Cowan |
| 8,724,054 B2 | 5/2014 | Jones |
| 8,754,426 B2 | 6/2014 | Marx et al. |
| 8,773,012 B2 | 7/2014 | Ryu et al. |
| 8,846,184 B2 | 9/2014 | Agrawal et al. |
| 8,851,694 B2 | 10/2014 | Harada |
| 8,876,352 B2 | 11/2014 | Robbins et al. |
| 8,905,610 B2 | 12/2014 | Coleman et al. |
| 8,952,341 B2 | 2/2015 | Kingsley et al. |
| 8,994,495 B2 | 3/2015 | Dassanayake et al. |
| 9,006,751 B2 | 4/2015 | Kleo et al. |
| 9,018,833 B2 | 4/2015 | Lowenthan et al. |
| 9,057,021 B2 | 6/2015 | Kingsley et al. |
| 9,059,378 B2 | 6/2015 | Verger et al. |
| 9,065,447 B2 | 6/2015 | Buttolo et al. |
| 9,067,530 B2 | 6/2015 | Bayersdorfer et al. |
| 9,187,034 B2 | 11/2015 | Tarahomi et al. |
| 9,299,887 B2 | 3/2016 | Lowenthal et al. |
| 9,315,148 B2 | 4/2016 | Schwenke et al. |
| 9,452,709 B2 | 9/2016 | Aburto Crespo |
| 9,568,659 B2 | 2/2017 | Verger et al. |
| 9,616,812 B2 | 4/2017 | Sawayanagi |
| 2002/0159741 A1 | 10/2002 | Graves et al. |
| 2002/0163792 A1 | 11/2002 | Formoso |
| 2003/0167668 A1 | 9/2003 | Fuks et al. |
| 2003/0179548 A1 | 9/2003 | Becker et al. |
| 2004/0213088 A1 | 10/2004 | Fuwausa |
| 2005/0084229 A1 | 4/2005 | Babbitt et al. |
| 2005/0189795 A1 | 9/2005 | Roessler |
| 2006/0087826 A1 | 4/2006 | Anderson, Jr. |
| 2006/0097121 A1 | 5/2006 | Fugate |
| 2007/0032319 A1 | 2/2007 | Tufte |
| 2007/0063553 A1* | 3/2007 | Lilov ................ B60R 7/04 297/188.17 |
| 2007/0075558 A1* | 4/2007 | Kim ................ B60N 2/793 296/24.34 |
| 2007/0075559 A1* | 4/2007 | Sturt ................ B60R 7/04 296/37.8 |
| 2007/0285938 A1 | 12/2007 | Palmer et al. |
| 2007/0297045 A1 | 12/2007 | Sakai et al. |
| 2008/0029986 A1* | 2/2008 | Watanabe ................ B60R 7/04 280/89.11 |
| 2008/0205075 A1 | 8/2008 | Hikmet et al. |
| 2009/0059230 A1 | 3/2009 | Ioka et al. |
| 2009/0217970 A1 | 9/2009 | Zimmerman et al. |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2010/0078954 A1 | 4/2010 | Liu et al. |
| 2010/0090491 A1* | 4/2010 | Hipshier ................ B60R 7/04 296/24.34 |
| 2010/0102736 A1 | 4/2010 | Hessling |
| 2011/0012062 A1 | 1/2011 | Agrawal et al. |
| 2011/0140472 A1* | 6/2011 | Vander Sluis ............ B60R 7/04 296/24.34 |
| 2011/0265360 A1 | 11/2011 | Podd et al. |
| 2012/0001406 A1 | 1/2012 | Paxton et al. |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0050979 A1 | 2/2013 | Van De Ven et al. |
| 2013/0092965 A1 | 4/2013 | Kijima et al. |
| 2013/0181473 A1* | 7/2013 | Jackson ................ B60N 3/101 296/37.16 |
| 2013/0335994 A1 | 12/2013 | Mulder et al. |
| 2014/0003044 A1 | 1/2014 | Harbers et al. |
| 2014/0029281 A1 | 1/2014 | Suckling et al. |
| 2014/0065442 A1 | 3/2014 | Kingsley et al. |
| 2014/0103258 A1 | 4/2014 | Agrawal et al. |
| 2014/0138975 A1* | 5/2014 | Washio ................ B60R 7/04 296/24.34 |
| 2014/0211498 A1 | 7/2014 | Cannon et al. |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0085488 A1 | 3/2015 | Grote, III et al. |
| 2015/0109602 A1 | 4/2015 | Martin et al. |
| 2015/0138789 A1 | 5/2015 | Singer et al. |
| 2015/0197189 A1* | 7/2015 | Salter ................ B60R 11/00 362/510 |
| 2015/0267881 A1 | 9/2015 | Salter et al. |
| 2015/0298603 A1* | 10/2015 | Salter ................ H05B 37/0218 362/510 |
| 2015/0307033 A1 | 10/2015 | Preisler et al. |
| 2016/0016506 A1 | 1/2016 | Collins et al. |
| 2016/0059761 A1* | 3/2016 | Bohlke ................ B60N 3/102 296/37.8 |
| 2016/0075274 A1* | 3/2016 | Huebner ................ B60R 7/04 362/510 |
| 2016/0102819 A1 | 4/2016 | Misawa et al. |
| 2016/0131327 A1 | 5/2016 | Moon et al. |
| 2016/0185289 A1* | 6/2016 | Shibata ................ B60H 1/34 362/96 |
| 2016/0236613 A1 | 8/2016 | Trier |

(56) References Cited

U.S. PATENT DOCUMENTS

| | | |
|---|---|---|
| 2016/0240794 A1 | 8/2016 | Yamada et al. |
| 2017/0158125 A1 | 6/2017 | Schuett et al. |
| 2017/0253179 A1 | 9/2017 | Kumada |
| 2018/0257535 A1* | 9/2018 | Salter .................... B60N 3/102 |

FOREIGN PATENT DOCUMENTS

| | | |
|---|---|---|
| CN | 201193011 Y | 2/2009 |
| CN | 204127823 U | 1/2015 |
| DE | 4120677 A1 | 1/1992 |
| DE | 29708699 U1 | 7/1997 |
| DE | 10319396 A1 | 11/2004 |
| EP | 1793261 A1 | 6/2007 |
| EP | 2778209 A1 | 9/2014 |
| JP | 2000159011 A | 6/2000 |
| JP | 2007238063 A | 9/2007 |
| KR | 20060026531 A | 3/2006 |
| WO | 2006047306 A1 | 5/2006 |
| WO | 2014068440 A1 | 5/2014 |
| WO | 2014161927 A1 | 10/2014 |

\* cited by examiner

US 10,189,414 B1

VEHICLE STORAGE ASSEMBLY

FIELD OF THE INVENTION

The present disclosure generally relates to vehicle storage compartments, and more particularly, to vehicle storage compartments within a passenger compartment of a vehicle.

BACKGROUND OF THE INVENTION

Passenger vehicles commonly employ various storage compartments within the passenger compartment thereof. It is desired to create additional storage compartments to meet consumer demands.

SUMMARY OF THE INVENTION

According to one aspect of the present disclosure, a storage assembly is provided herein. The storage assembly includes a console housing defined by a plurality of surfaces. A member extends along at least one of the plurality of surfaces and is movable along the console housing between a closed position and an open position. The member defines a storage compartment in the open position.

According to another aspect of the present disclosure, a storage assembly is provided herein. The storage assembly includes a member movable along a console housing between a closed position and an open position. The member defines a storage compartment in the open position. A substrate defines a bottom surface of the storage compartment. The substrate is expandable as the member is moved between the open and closed positions.

According to yet another aspect of the present disclosure, a vehicle storage assembly is provided herein. The vehicle storage assembly includes a member movable along a console housing between a closed position and an open position. The member defines a storage compartment in the open position. A substrate defines a bottom surface of the storage compartment. The substrate is expandable as the member is moved between the open and closed positions. A light source is configured to illuminate the storage compartment in the open position.

These and other aspects, objects, and features of the present invention will be understood and appreciated by those skilled in the art upon studying the following specification, claims, and appended drawings.

DETAILED DESCRIPTION OF THE PREFERRED EXAMPLES

Figure 2:
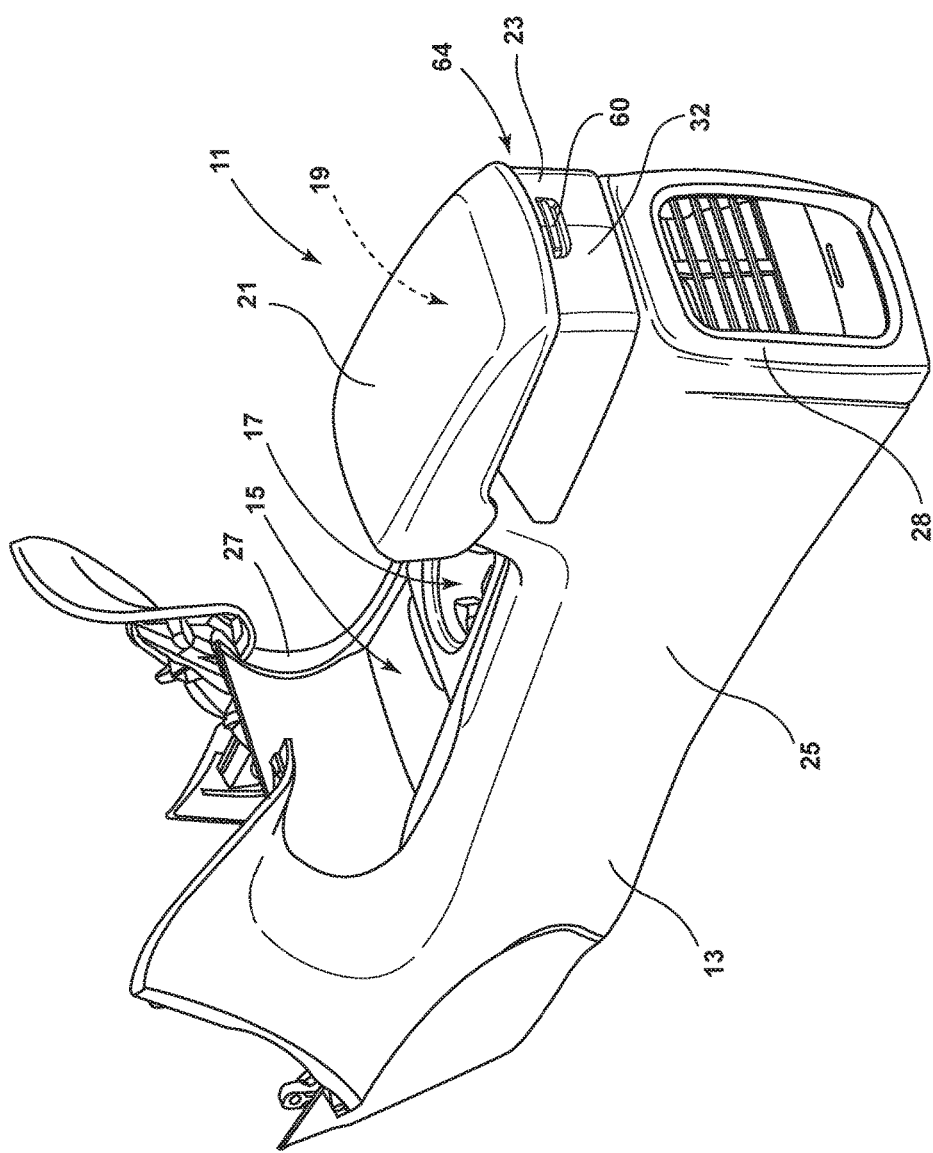
FIG. 2 is a rear perspective view of a vehicle center console having a sliding storage compartment disposed in a closed position, according to some examples.

For purposes of description herein, the terms "upper," "lower," "right," "left," "rear," "front," "vertical," "horizontal," and derivatives thereof shall relate to the invention as oriented in FIG. 2. However, it is to be understood that the invention may assume various alternative orientations, except where expressly specified to the contrary. It is also to be understood that the specific devices and processes illustrated in the attached drawings, and described in the following specification are simply exemplary examples of the inventive concepts defined in the appended claims. Hence, specific dimensions and other physical characteristics relating to the examples disclosed herein are not to be considered as limiting, unless the claims expressly state otherwise.

As required, detailed examples of the present invention are disclosed herein. However, it is to be understood that the disclosed examples are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a storage assembly for a vehicle. The storage assembly may include a member that extends from a panel within the vehicle to form a storage compartment. The storage assembly further includes an extendable substrate forming a bottom structure of the storage compartment. The storage assembly may employ a light source for illuminating the storage compartment. The storage assembly may further employ one or more phosphorescent and/or luminescent structures to luminesce in response to predefined events. The one or more luminescent structures may be configured to convert emitted light received from an associated light source and re-emit the light at a different wavelength generally found in the visible spectrum.

Figure 1A:
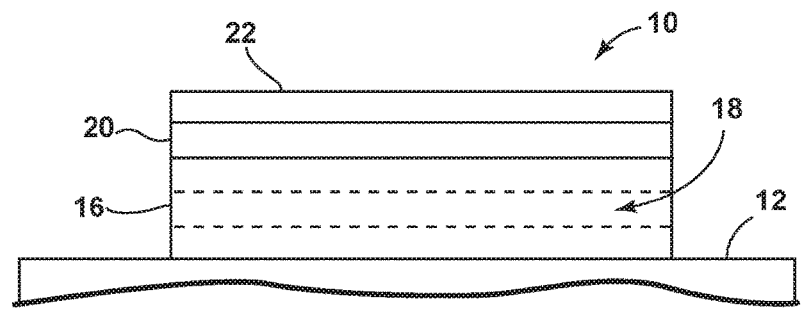
FIG. 1A is a side view of a luminescent structure rendered as a coating, according to some examples.
Figure 1B:
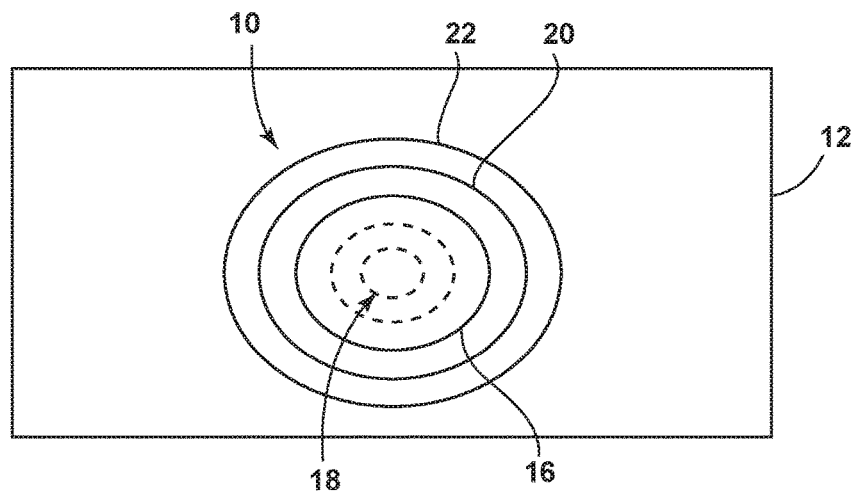
FIG. 1B is a top view of a luminescent structure rendered as a discrete particle, according to some examples.
Figure 1C:
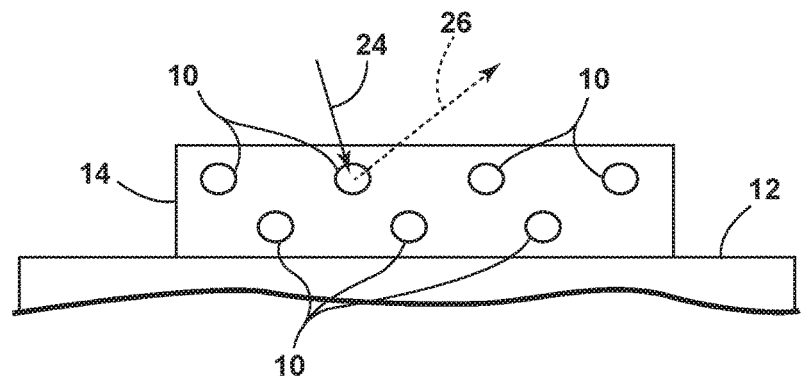
FIG. 1C is a side view of a plurality of luminescent structures rendered as discrete particles and incorporated into a separate structure.

Referring to FIGS. 1A-1C, various exemplary examples of luminescent structures 10 are shown, each capable of being coupled to a substrate 12, which may correspond to a vehicle fixture or vehicle-related piece of equipment. In FIG. 1A, the luminescent structure 10 is generally shown rendered as a coating (e.g., a film) that may be applied to a surface of the substrate 12. In FIG. 1B, the luminescent structure 10 is generally shown as a discrete particle capable of being integrated with a substrate 12. In FIG. 1C, the luminescent structure 10 is generally shown as a plurality of discrete particles that may be incorporated into a support medium 14 (e.g., a film) that may then be applied (as shown) or integrated with the substrate 12.

At the most basic level, a given luminescent structure 10 includes an energy conversion layer 16 that may include one or more sublayers, which are exemplarily shown in broken lines in FIGS. 1A and 1B. Each sublayer of the energy conversion layer 16 may include one or more luminescent materials 18 having energy converting elements with phosphorescent or fluorescent properties. Each luminescent material 18 may become excited upon receiving an emitted light 24 of a specific wavelength, thereby causing the light to undergo a conversion process. Under the principle of down conversion, the emitted light 24 is converted into a longer-wavelength, converted light 26 that is outputted from the luminescent structure 10. Conversely, under the principle of up conversion, the emitted light 24 is converted into a shorter wavelength light that is outputted from the luminescent structure 10. When multiple distinct wavelengths of light are outputted from the luminescent structure 10 at the same time, the wavelengths of light may mix together and be expressed as a multicolor light.

The energy conversion layer 16 may be prepared by dispersing the luminescent material 18 in a polymer matrix to form a homogenous mixture using a variety of methods. Such methods may include preparing the energy conversion layer 16 from a formulation in a liquid carrier support medium 14 and coating the energy conversion layer 16 to a desired substrate 12. The energy conversion layer 16 may be applied to a substrate 12 by painting, screen-printing, spraying, slot coating, dip coating, roller coating, and bar coating. Alternatively, the energy conversion layer 16 may be prepared by methods that do not use a liquid carrier support medium 14. For example, the energy conversion layer 16 may be rendered by dispersing the luminescent material 18 into a solid-state solution (homogenous mixture in a dry state) that may be incorporated in a polymer matrix, which may be formed by extrusion, injection molding, compression molding, calendaring, thermoforming, etc. The energy conversion layer 16 may then be integrated into a substrate 12 using any methods known to those skilled in the art. When the energy conversion layer 16 includes sublayers, each sublayer may be sequentially coated to form the energy conversion layer 16. Alternatively, the sublayers can be separately prepared and later laminated or embossed together to form the energy conversion layer 16. Alternatively still, the energy conversion layer 16 may be formed by coextruding the sublayers.

In various examples, the converted light 26 that has been down converted or up converted may be used to excite other luminescent material(s) 18 found in the energy conversion layer 16. The process of using the converted light 26 outputted from one luminescent material 18 to excite another, and so on, is generally known as an energy cascade and may serve as an alternative for achieving various color expressions. With respect to either conversion principle, the difference in wavelength between the emitted light 24 and the converted light 26 is known as the Stokes shift and serves as the principal driving mechanism for an energy conversion process corresponding to a change in wavelength of light. In the various examples discussed herein, each of the luminescent structures 10 may operate under either conversion principle.

Referring back to FIGS. 1A and 1B, the luminescent structure 10 may optionally include at least one stability layer 20 to protect the luminescent material 18 contained within the energy conversion layer 16 from photolytic and thermal degradation. The stability layer 20 may be configured as a separate layer optically coupled and adhered to the energy conversion layer 16. Alternatively, the stability layer 20 may be integrated with the energy conversion layer 16. The luminescent structure 10 may also optionally include a protective layer 22 optically coupled and adhered to the stability layer 20 or other layer (e.g., the conversion layer 16 in the absence of the stability layer 20) to protect the luminescent structure 10 from physical and chemical damage arising from environmental exposure. The stability layer 20 and/or the protective layer 22 may be combined with the energy conversion layer 16 through sequential coating or printing of each layer, sequential lamination or embossing, or any other suitable means.

According to various examples, the luminescent material 18 may include organic or inorganic fluorescent dyes including rylenes, xanthenes, porphyrins, and phthalocyanines. Additionally, or alternatively, the luminescent material 18 may include phosphors from the group of Ce-doped garnets such as YAG:Ce and may be a short-persistence luminescent material 18. For example, an emission by $Ce^{3+}$ is based on an electronic energy transition from $4D^1$ to $4f^1$ as a parity allowed transition. As a result of this, a difference in energy between the light absorption and the light emission by $Ce^{3+}$ is small, and the luminescent level of $Ce^{3+}$ has an ultra-short lifespan, or decay time, of $10^{-8}$ to $10^{-7}$ seconds (10 to 100 nanoseconds). The decay time may be defined as the time between the end of excitation from the emitted light 24 and the moment when the light intensity of the converted light 26 emitted from the luminescent structure 10 drops below a minimum visibility of 0.32 mcd/m$^2$. A visibility of 0.32 mcd/m² is roughly 100 times the sensitivity of the dark-adapted human eye, which corresponds to a base level of illumination commonly used by persons of ordinary skill in the art.

Figure 4:
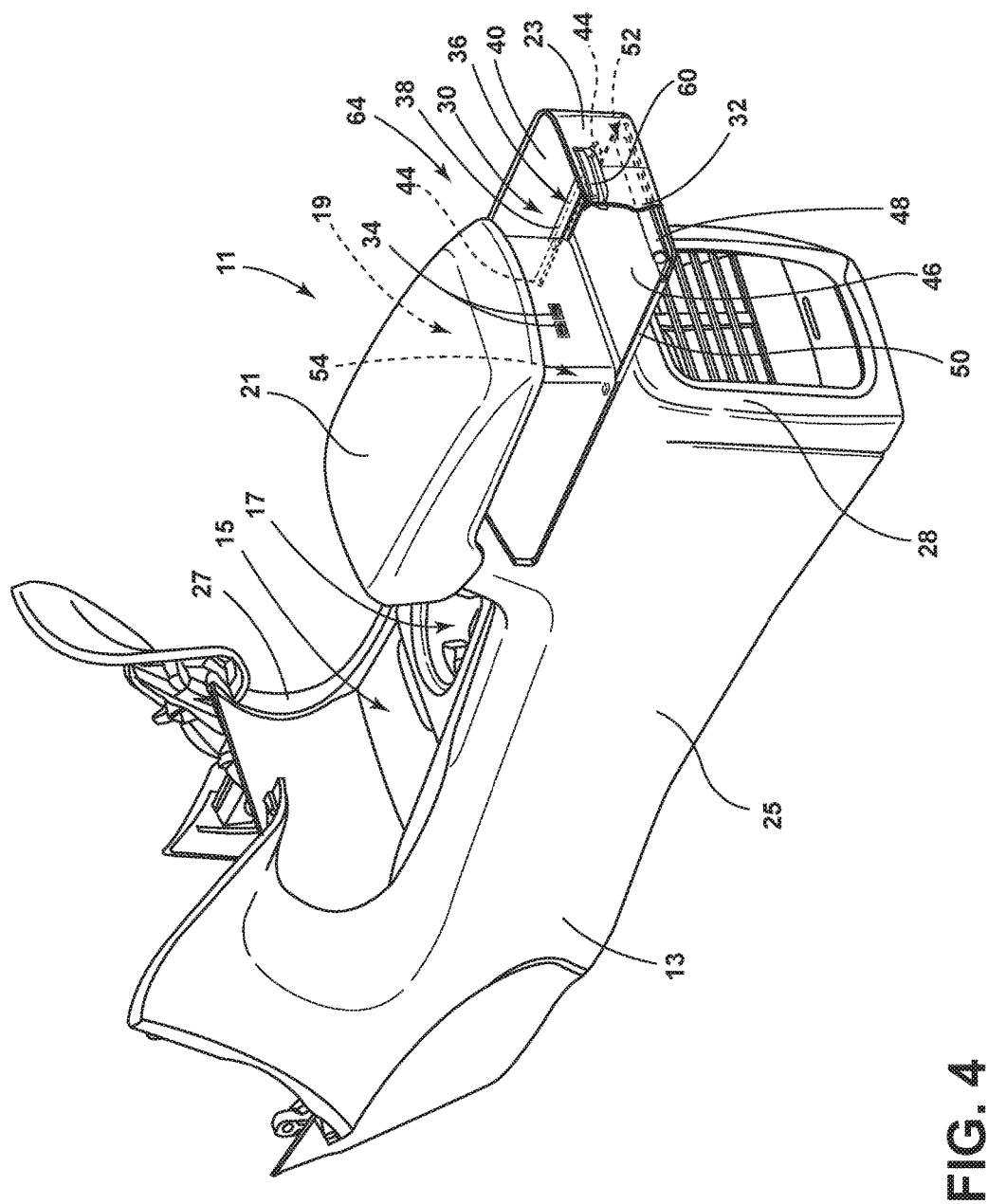
FIG. 4 is a rear perspective view of the storage compartment having an extendable substrate disposed therein, according to some examples.

According to various examples, a $Ce^{3+}$ garnet may be utilized, which has a peak excitation spectrum that may reside in a shorter wavelength range than that of conventional YAG:Ce-type phosphors. Accordingly, $Ce^{3+}$ has short-persistence characteristics such that its decay time may be 100 milliseconds or less. Therefore, in various examples, the rare earth aluminum garnet type Ce phosphor may serve as the luminescent material 18 with ultra-short-persistence characteristics, which can emit the converted light 26 by absorbing purple to blue emitted light 24 emanated from a light source 62 (FIG. 4). According to various examples, a ZnS:Ag phosphor may be used to create a blue converted light 26. A ZnS:Cu phosphor may be utilized to create a yellowish-green converted light 26. A $Y_2O_2S$:Eu phosphor may be used to create red converted light 26. Moreover, the aforementioned phosphorescent materials may be combined to form a wide range of colors, including white light. It will be understood that any short-persistence luminescent material 18 known in the art may be utilized without departing from the teachings provided herein.

Additionally, or alternatively, the luminescent material 18, according to various examples, disposed within the luminescent structure 10 may include a long-persistence luminescent material 18 that emits the converted light 26, once charged by the emitted light 24. The emitted light 24 may be emitted from any excitation source (e.g., any natural light source, such as the sun, and/or any artificial light sources 62). The long-persistence luminescent material 18 may be defined as having a long decay time due to its ability to store the emitted light 24 and release the converted light 26 gradually, for a period of several minutes or hours, once the emitted light 24 is no longer present.

The long-persistence luminescent material 18, according to various examples, may be operable to emit light at or above an intensity of 0.32 mcd/m² after a period of 10 minutes. Additionally, the long-persistence luminescent material 18 may be operable to emit light above or at an intensity of 0.32 mcd/m² after a period of 30 minutes and, in various examples, for a period substantially longer than 60 minutes (e.g., the period may extend 24 hours or longer, and in some instances, the period may extend 48 hours). Accordingly, the long-persistence luminescent material 18 may continually illuminate in response to excitation from any light source 62 that emits the emitted light 24, including, but not limited to, natural light sources (e.g., the sun) and/or any artificial light source 62. The periodic absorption of the emitted light 24 from any excitation source may provide for a substantially sustained charge of the long-persistence luminescent material 18 to provide for consistent passive illumination. In various examples, a light sensor may monitor the illumination intensity of the luminescent structure 10 and actuate an excitation source when the illumination intensity falls below 0.32 mcd/m², or any other predefined intensity level.

The long-persistence luminescent material 18 may correspond to alkaline earth aluminates and silicates, for example, doped di-silicates, or any other compound that is capable of emitting light for a period of time once the emitted light 24 is no longer present. The long-persistence luminescent material 18 may be doped with one or more ions, which may correspond to rare earth elements, for example, Eu2+, Tb3+, and/or Dy3. According to one non-limiting exemplary example, the luminescent structure 10 includes a phosphorescent material in the range of about 30% to about 55%, a liquid carrier medium in the range of about 25% to about 55%, a polymeric resin in the range of about 15% to about 35%, a stabilizing additive in the range of about 0.25% to about 20%, and performance-enhancing additives in the range of about 0% to about 5%, each based on the weight of the formulation.

The luminescent structure 10, according to various examples, may be a translucent white color, and in some instances reflective, when unilluminated. Once the luminescent structure 10 receives the emitted light 24 of a particular wavelength, the luminescent structure 10 may emit any color light (e.g., blue or red) therefrom at any desired brightness. According to various examples, a blue-emitting phosphorescent material may have the structure $Li_2ZnGeO_4$ and may be prepared by a high-temperature solid-state reaction method or through any other practicable method and/or process. The afterglow may last for a duration of 2-8 hours and may originate from the emitted light 24 and d-d transitions of Mn2+ ions.

According to an alternate non-limiting example, 100 parts of a commercial solvent-borne polyurethane, such as Mace resin 107-268, having 50% solids polyurethane in toluene/isopropanol, 125 parts of a blue-green long-persistence phosphor, such as Performance Indicator PI-BG20, and 12.5 parts of a dye solution containing 0.1% Lumogen Yellow F083 in dioxolane may be blended to yield a low rare earth mineral luminescent structure 10. It will be understood that the compositions provided herein are non-limiting examples. Thus, any phosphor known in the art may be utilized within the luminescent structure 10 without departing from the teachings provided herein. Moreover, it is contemplated that any long-persistence phosphor known in the art may also be utilized without departing from the teachings provided herein.

Figure 3:
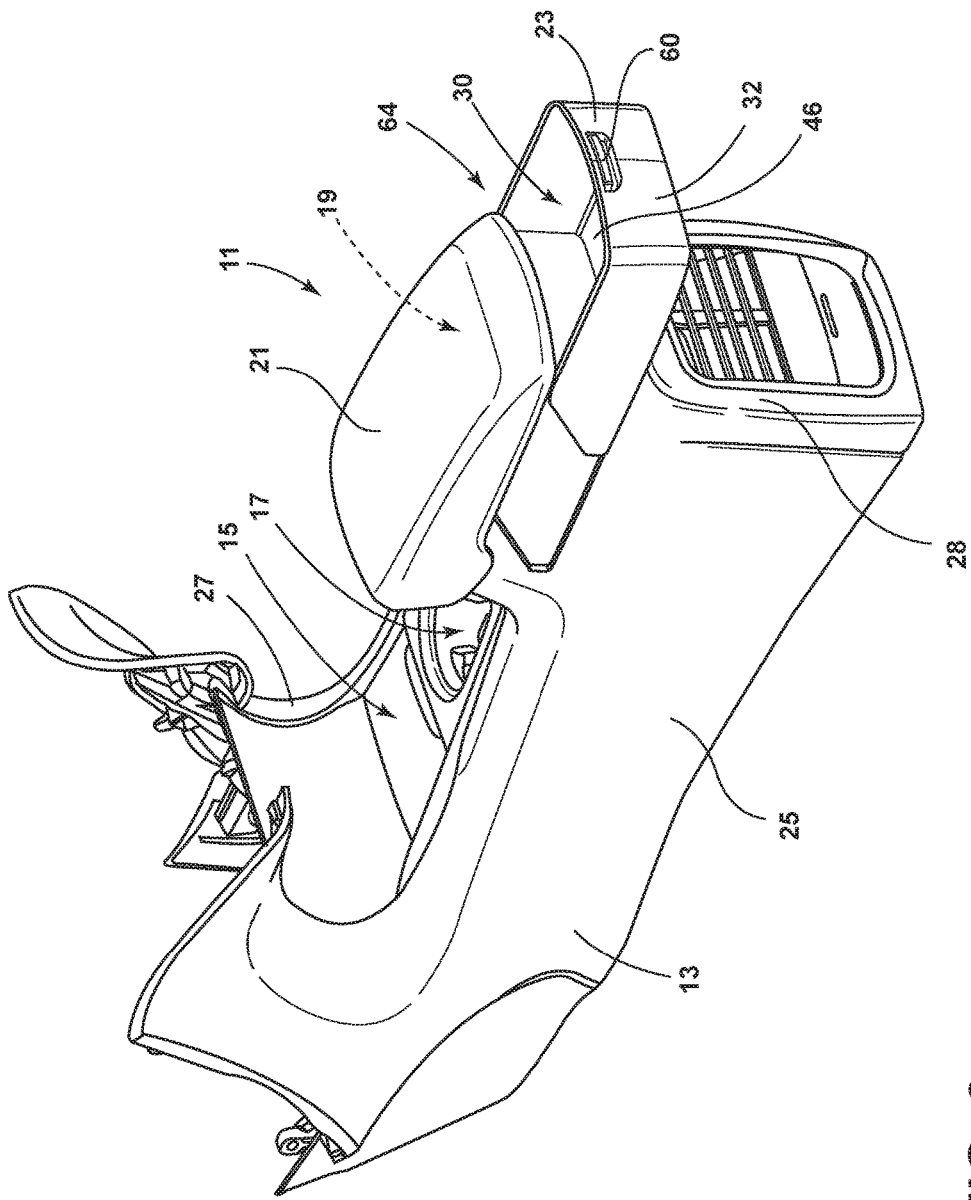
FIG. 3 is a rear perspective view of the vehicle center console having a storage compartment disposed in an open position, according to some examples.

Referring to FIGS. 2 and 3, a console assembly 11 includes an outer casing or housing 13. As shown in FIGS. 2 and 3, the console assembly 11 is in the form of a center console, which is configured to be disposed within a vehicle passenger compartment interior, generally between the driver and front passenger seats. While a center console is illustrated in the illustrated example, any vehicle interior panel may form the housing 13 without departing from the scope of the present disclosure. The console assembly 11 generally includes a front console storage area 15 and front cup holder 17. The console assembly 11 further defines a rear storage area 19 and a rear storage area cover 21. The rear storage area may be in the form of a bin adapted to store or place various items therein.

A storage assembly 64 may be coupled to the console assembly 11, and/or any other panel within the vehicle, and includes a member 23 disposed along one or more surfaces 25, 27, 28 of the housing 13. The member 23 may be slidable relative to the housing 13 between a closed position and an open position. When disposed in the open position, the member 23 may define a storage compartment 30 that may house any desired item.

Still referring to FIGS. 2 and 3, the member 23 is movable between the closed position, wherein a contour of an exterior surface 32 of the member 23 may substantially match that of the surrounding console assembly housing 13, and the open position, wherein the member 23 and the housing 13 define a storage compartment 30 therebetween. In some examples, a passenger accessible feature 34 (FIG. 4) may be exposed and accessible external the console assembly housing 13 when the member 23 is disposed in the open position. Passenger accessible features 34 (FIG. 4) may include electronic ports, passenger controls, storage bins, or any other feature 34 that may be desirable to a passenger who has access to the member 23 when the member 23 is placed in the open position. Additional passenger accessible features 34 and controls may be disposed on the member 23, including, but not limited to, passenger climate control, audio control buttons, rear vehicle occupant heated seats, or any other passenger controlled feature 34 within the vehicle.

Referring to FIG. 4, the member 23, according to some examples, may be generally formed in a U-shape that encompasses three sides of the housing 13. However, it will be appreciated that the member 23 may have any geometry without departing from the scope of the present disclosure. The member 23 may be formed from any desirable material, including but not limited to, a polymeric material such as acrylonitrile-butadiene-styrene (ABS), polypropylene (PP), thermoplastic olefin (TPO), styrene block copolymer (SEBS), thermoplastic polyurethane (TPU), polyethylene terephthalate (PET), or any other material known in the art.

With further reference to FIG. 4, the member 23 is slidable between the open and closed positions about a track assembly 36. The track assembly 36 includes a channel 38 that may be disposed on one or more interior surfaces 40 of the member 23. A retaining feature 42 may extend from the housing 13 and have an outer portion that is disposed within the channel 38. It will be appreciated that the channel 38 may be disposed on the housing 13 and/or the member 23. Likewise, the retaining feature 42 may also be disposed on the member 23 and/or the housing 13 without departing from the scope of the present disclosure. Moreover, any other slidable assembly may be used in lieu of and/or in conjunction with the track assembly 36 provided herein without departing from the scope of the present disclosure. A pair of stops 44 may be disposed within the channel 38. A first stop 44 may releasably retain the member 23 in the closed position while a second stop 44 may releasably retain the member 23 in a fully open position.

Referring still to FIG. 4, a substrate 46 may be operably coupled with the member 23 and support items stored within the storage compartment 30 when the member 23 is in the open position. A spool 48 may be coupled to the member 23 and a pair of guides 50 may be disposed along a bottom portion of the member 23. The substrate 46 may be formed from a flexible material spanning a width of the storage compartment 30. A first end portion 52 of the substrate 46 is coupled to the spool 48 and a second end portion 54 is coupled with the housing 13 such that substrate 46 is selectively extendable as the member 23 is moved to the open position and retractable on the spool 48.

As shown in FIG. 4, the spool 48, which is in the shape of an elongated cylinder, is rotatably coupled at a location within the interior of the storage compartment 30. When in a retracted position with respect to the spool 48, the majority of the substrate 46 may be positioned within the storage compartment 30 and out of view from occupants of the vehicle. The first end portion 52 of substrate 46 is secured to the spool 48 so that the substrate 46 can be rolled up on the spool 48, such as in a retracted position. In some examples, the spool 48 may be spring biased such that the spool 48 tends to urge the substrate 46 into the retracted position, thereby helping maintain tension on the substrate 46 when it is in the extended position, and to help roll the substrate 46 onto the spool 48 during retraction of substrate 46.

Referring again to FIG. 4, the spool 48 can be sized to extend and span substantially the width of the storage compartment 30. In the example shown in FIG. 4, the spool 48 spans width of the storage compartment 30 as a substantially unitary structure, i.e. such that a single spool 48 itself spans the entire width. In such a structure, a single, unitary substrate 46 is configured to extend from spool 48 to substantially cover the bottom surface of the storage compartment 30. As such, the entirety of the first end portion 52 extends along and is coupled to the spool 48. The spool 48 can be coupled with the housing 13 such that the substrate 46 can extend outwardly from the housing 13.

Figure 5:
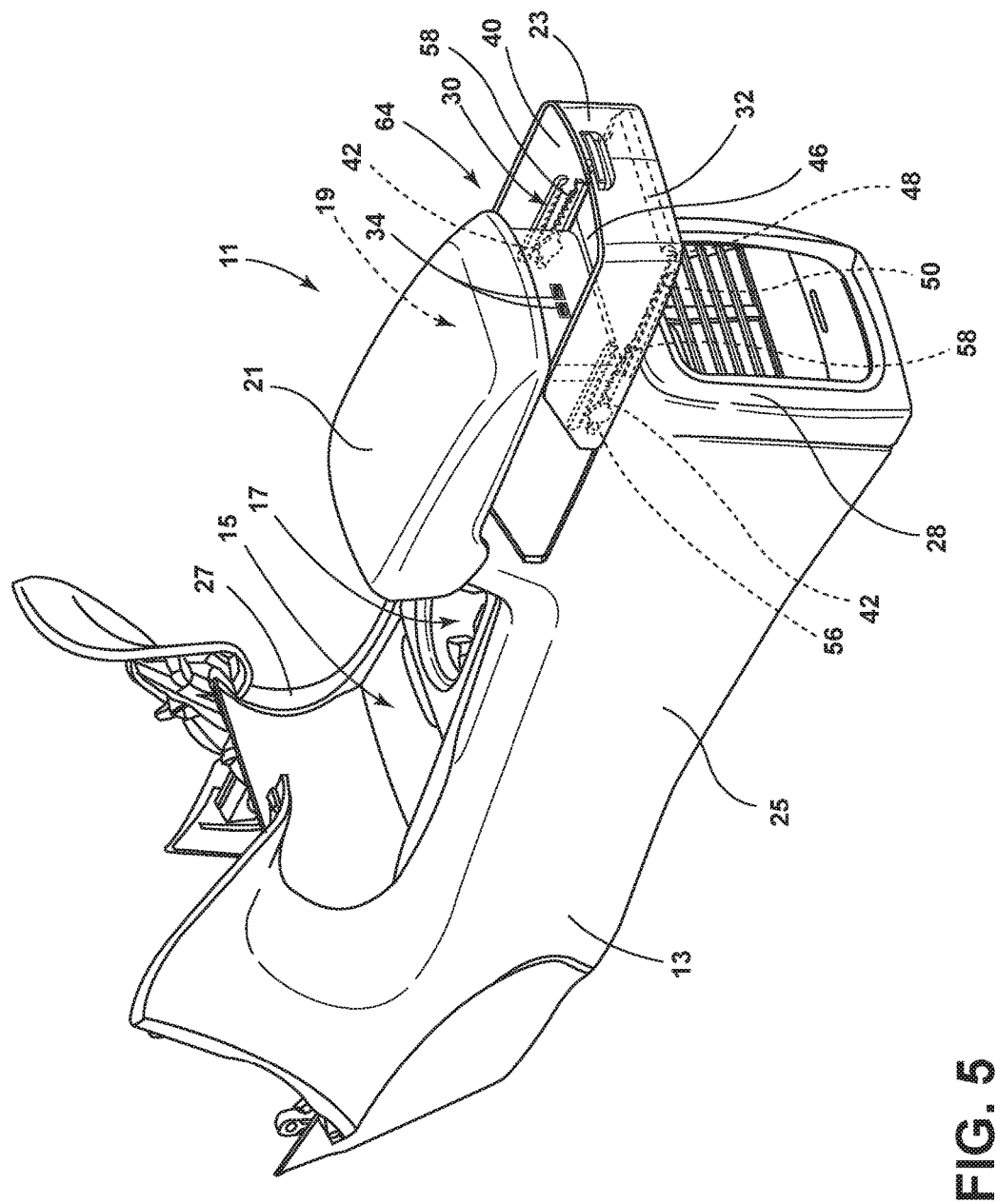
FIG. 5 is a rear perspective view of the storage compartment having a damper disposed between the center console and a member forming the storage compartment, according to some examples.

Referring to FIG. 5, a damper 56 may secure the member 23 in the stowed position, the deployed position, and/or an intermediate position. The damper 56 may maintain the member 23 in a substantially constant position when the member 23 is deployed, and in some instances, when the member 23 is deployed rapidly. The damper 56 may be mounted within the housing 13 and can be arranged to engage a rack 58 that can be positioned on the member 23. According to some examples, the damper 56 can be a fluid damper. The damper 56 can include a gear that can be connected to a disk contained in a housing containing a viscous fluid. Rotation of the gear can rotate the disk in the viscous fluid so that the damper 56 can slow the movement of the member 23 to provide a smooth and/or steady opening and closing motion of the member 23. Those skilled in the art will appreciate that the damper 56 can be other damper arrangements including pneumatic, hydraulic, and mechanical dampers instead of a viscous damper 56 described above. In operation, a user can grasp a handle 60 (FIG. 6) to move the member 23 between the open and closed positions. The damper 56 can allow the member 23 to move smoothly between positions without opening or closing hard. The member 23 described herein can be provided with a damper 56 to improve a user's experience with the member 23 and also to help prevent accidental opening of the member 23.

Figure 6:
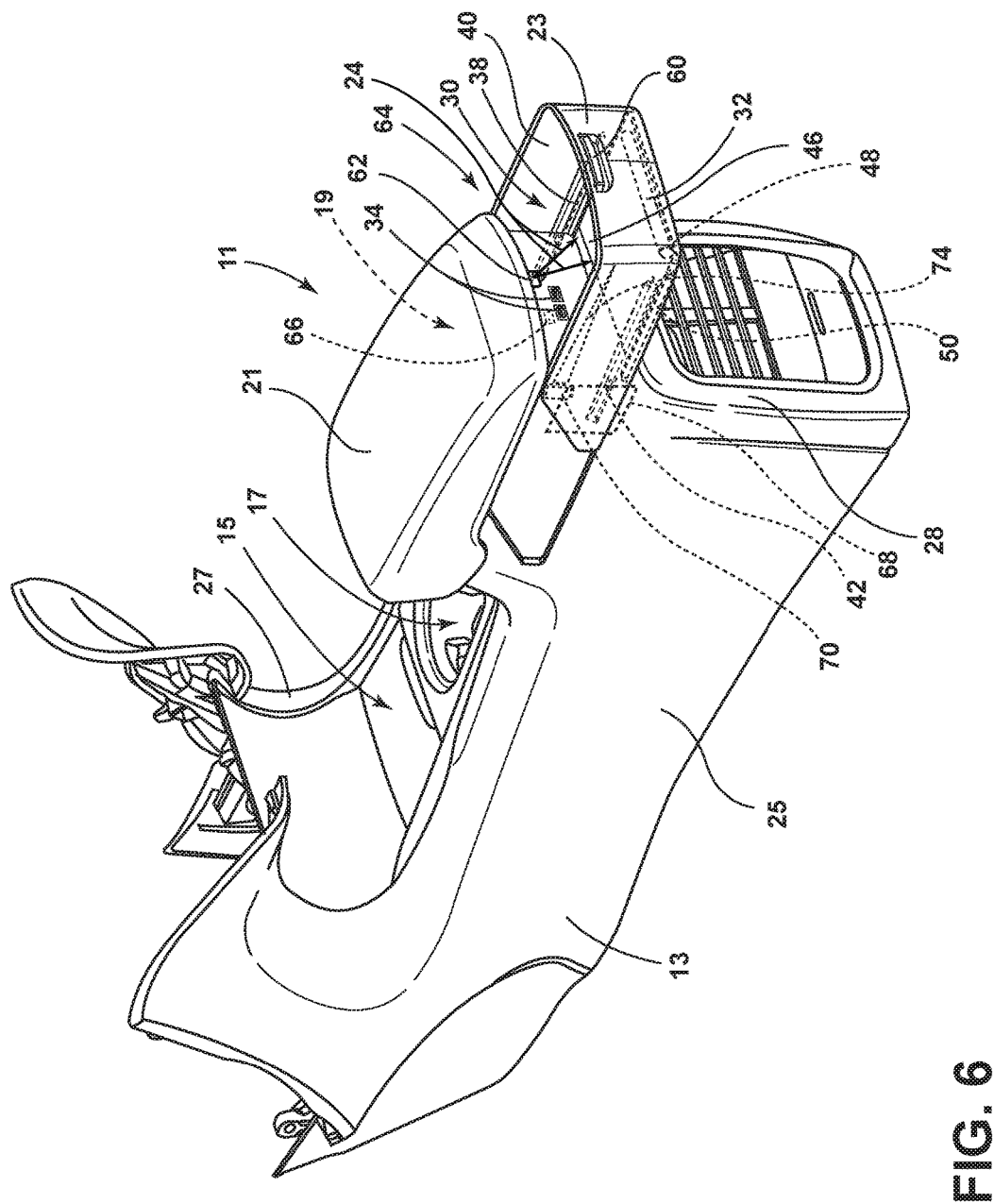
FIG. 6 is a rear perspective view of the storage compartment having a switch operably coupled to the center console, according to some examples.

Referring to FIG. 6, a light source 62 may be coupled to the housing 13 and provide illumination to the storage compartment 30, when disposed in the open position, and/or provide illumination within the rear storage area. With respect to the examples described herein, the light source 62 may be configured to emit visible and/or non-visible light, such as blue light, UV light, infrared, and/or violet light and may include any form of light source. For example fluorescent lighting, light-emitting diodes (LEDs), organic LEDs (OLEDs), polymer LEDs (PLEDs), laser diodes, quantum dot LEDs (QD-LEDs), solid-state lighting, a hybrid of these or any other similar device, or any other form of lighting. Further, various types of LEDs are suitable for use as the light source 62 including, but not limited to, top-emitting LEDs, side-emitting LEDs, and others. Moreover, according to various examples, multicolored light source, such as Red, Green, and Blue (RGB) LEDs that employ red, green, and blue LED packaging may be used to generate various desired colors of light output from a single light source, according to known light color mixing techniques.

The light source 62 may be operably coupled to a controller 66 that may activate the light source 62 based on a plurality of inputs and may modify the intensity of the light 50 emitted by the light source 62 by pulse-width modulation, current control, and/or any other method known in the art. In various examples, the controller 66 may be configured to adjust a color and/or intensity of emitted light 24 emitted from the light source 62 by sending control signals to adjust an intensity or energy output level of the light source 62. According to some examples, the controller 66 may increase the intensity of emitted light 24 emitted from the light source 62 up to five times steady state.

Figure 7:
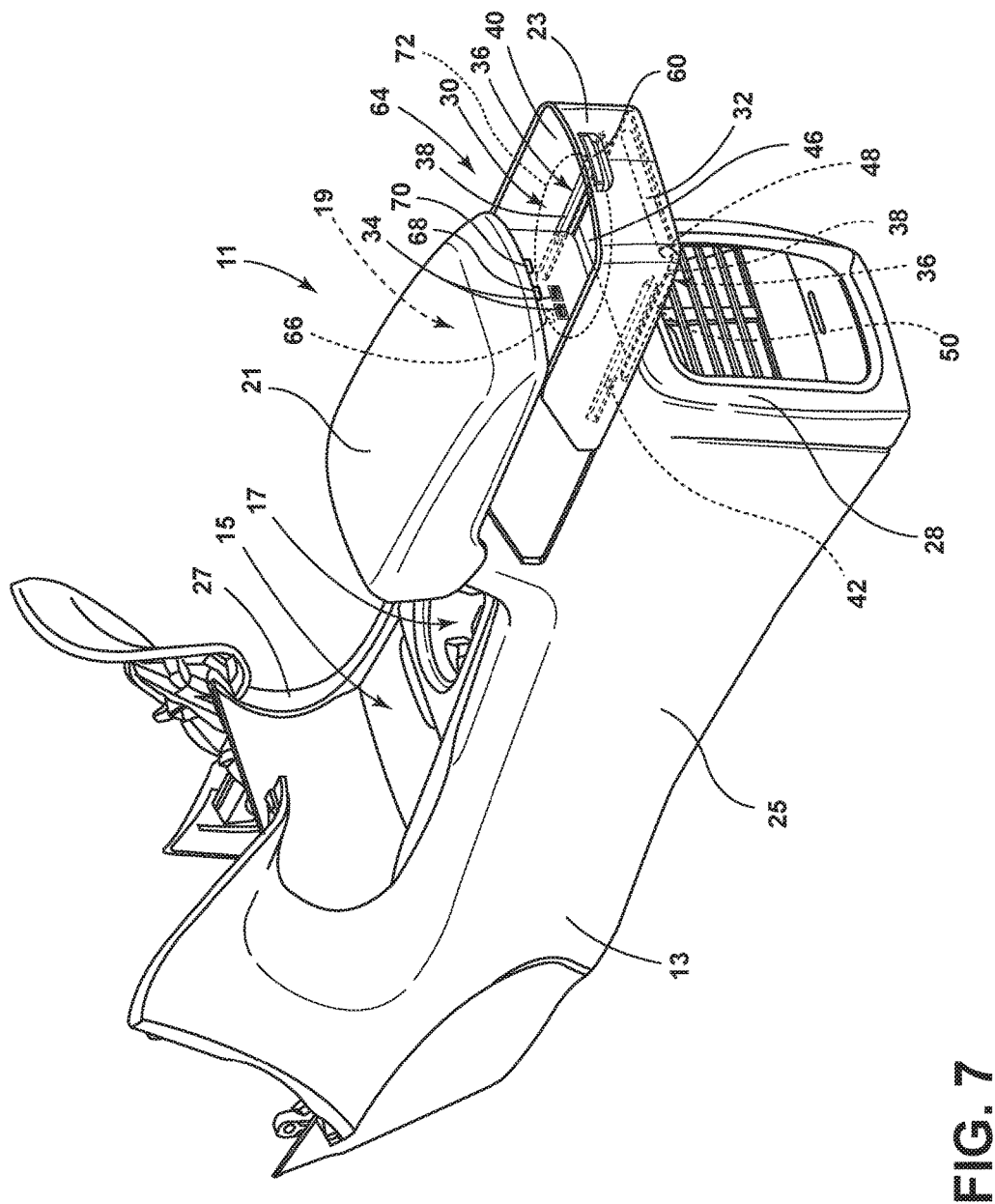
FIG. 7 is a rear perspective view of the storage compartment having a light source and a proximity switch operably coupled with the center console, according to some examples.

Referring to FIGS. 6 and 7, one or more switches 68 may be operably coupled with the member 23 for sensing the position of the member 23. The switch 68 may be configured as a capacitive sensor 70. The capacitive sensors 70 each provide a capacitive sense activation field 72 to sense contact or close proximity (e.g., within one mm) of a conductive object in relation to the corresponding capacitive sensor 70. When the member 23 is moved from the closed position to the open position, or vice versa, a conductive material 74 on the member 23 enters a capacitive sense activation field 72. The corresponding capacitive sensor 70 detects a disturbance caused by the member 23 to the activation field 72 and determines whether the disturbance is sufficient to generate an input with the corresponding capacitive sensor 70. The disturbance of the activation field 72 is detected by processing the charge pulse signal associated with the corresponding signal channel for that capacitive sensor 70. Each capacitive sensor 70 has its own dedicated signal channel generating a distinct charge pulse signal, which may be processed individually.

In some examples, the conductive material 74 may be disposed on the interior surface 40 of the member 23 in a non-linear orientation, such as a triangular orientation. The conductive material 74 may be formed with conductive ink or may alternatively be formed with any other conductive material 74. The capacitive sense activation field 72 of each capacitive sensor 70 detects the member 23, which has electrical conductivity and dielectric properties that cause a change or disturbance in the capacitive sense activation field 72 as should be evident to those skilled in the art. Each of the capacitive sensors 70 provides a sensed signal for a corresponding switch 68 indicative of a member position. As the member 23 is moved from the closed position to the open position, the switch 68 detects a higher threshold signal and a switch output may be generated to activate the light source 62. When a lower threshold signal is detected, a switch output may be generated that is indicative of the member 23 being disposed in the closed position and the light source 62 may be deactivated.

As illustrated in FIG. 7, the switch 68 may be disposed on the rear surface 28 of the console assembly 11 and may be directed rearwardly. The switch 68 may be configured to detect whether a rear portion of the member 23 is in the open or the closed position. Additionally, and/or alternatively, the switch 68 may be configured to detect a user's hand and/or an item within the storage compartment 30 and activate the light source 62 based on the outputted signal from the switch 68. In other examples, any other type of switch 68 may be used without departing from the scope of the present disclosure. For example, a push button switch 68 may be used in conjunction with, or in lieu of, the capacitive sensor 70 described herein.

Figure 8:
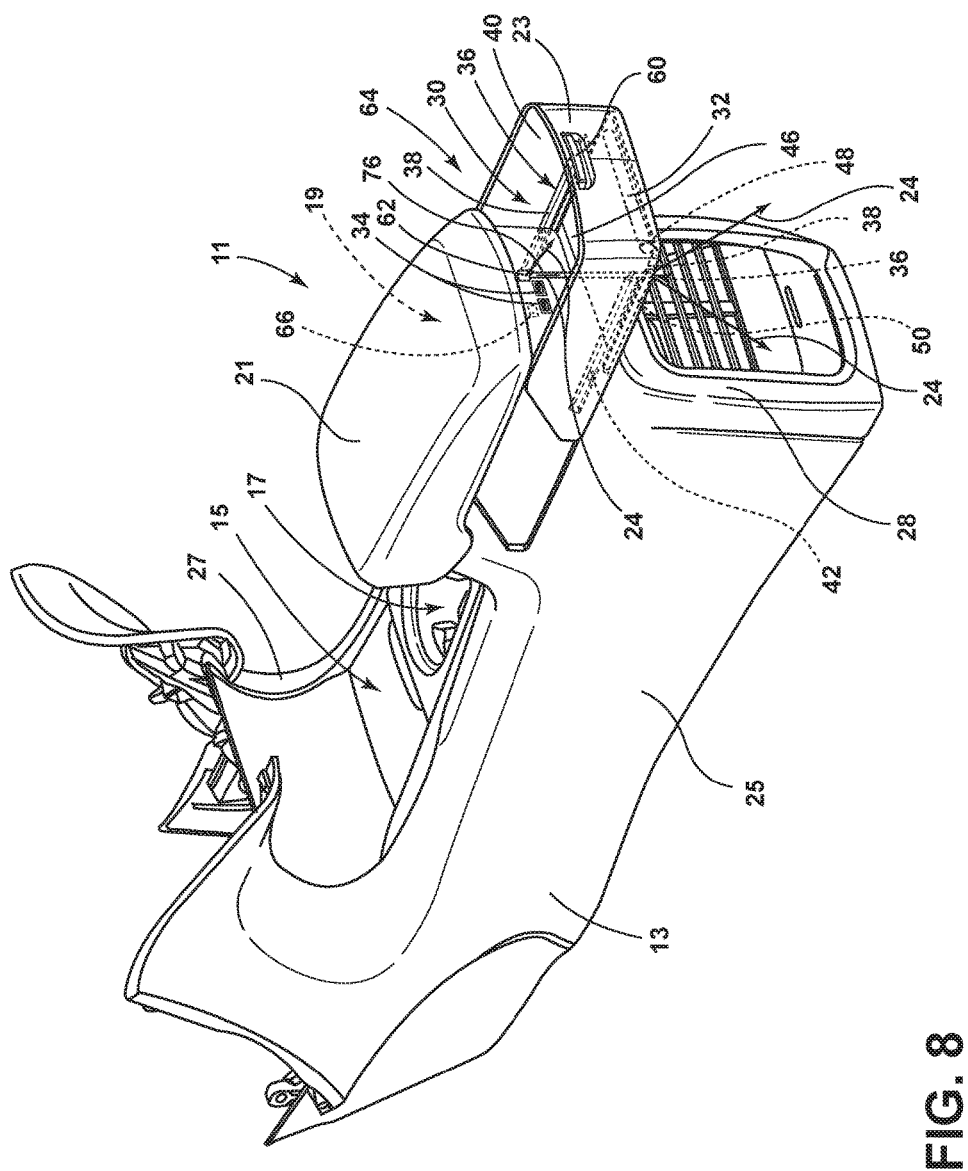
FIG. 8 is a rear perspective view of the storage compartment having a light guide operably coupled with the center console, according to some examples.

Referring to FIG. 8, the light source 62 may be operably coupled with a light guide 76 that extends along the rear surface 28 of the housing 13. The light guide 76 may be configured to direct emitted light 24 within the storage compartment 30 and/or below the storage compartment 30. The light may be directed below the storage compartment 30 when the storage compartment 30 is in the open and/or the closed positions. The light guide 76 described herein may be formed from a rigid material that is comprised of a curable substrate such as a polymerizable compound, a mold in clear (MIC) material or mixtures thereof. Acrylates are also commonly used for forming rigid light pipes, as well as polymethyl methacrylate (PMMA), which is a known substitute for glass. A polycarbonate material may also be used in an injection molding process to form the rigid light guides. Further, the light guide 76 may be a flexible light guide, wherein a suitable flexible material is used to create the light guide 76. Such flexible materials include urethanes, silicone, thermoplastic polyurethane (TPU), or other like optical grade flexible materials. Whether the light guide 76 is flexible or rigid, the light guide 76, when formed, is substantially optically transparent and/or translucent and capable of transmitting emitted light 24. The light guide 76 may be referred to as a light pipe, a light plate, a light bar or any other light carrying or transmitting substrate made from a clear or substantially translucent material.

Figure 9:
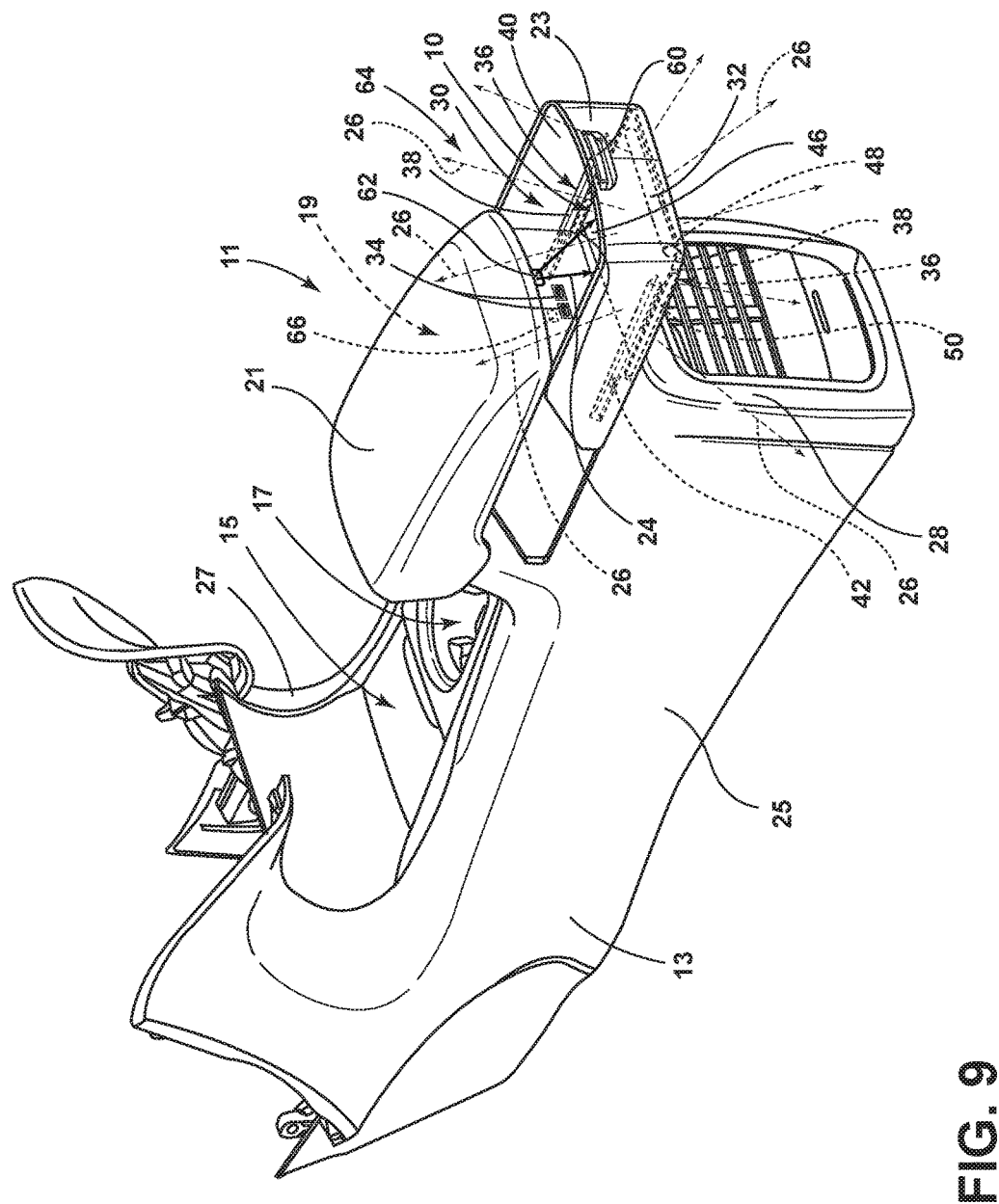
FIG. 9 is a rear perspective view of the storage compartment, the light source operably coupled with the luminescent structure, according to some examples.
Figure 10:
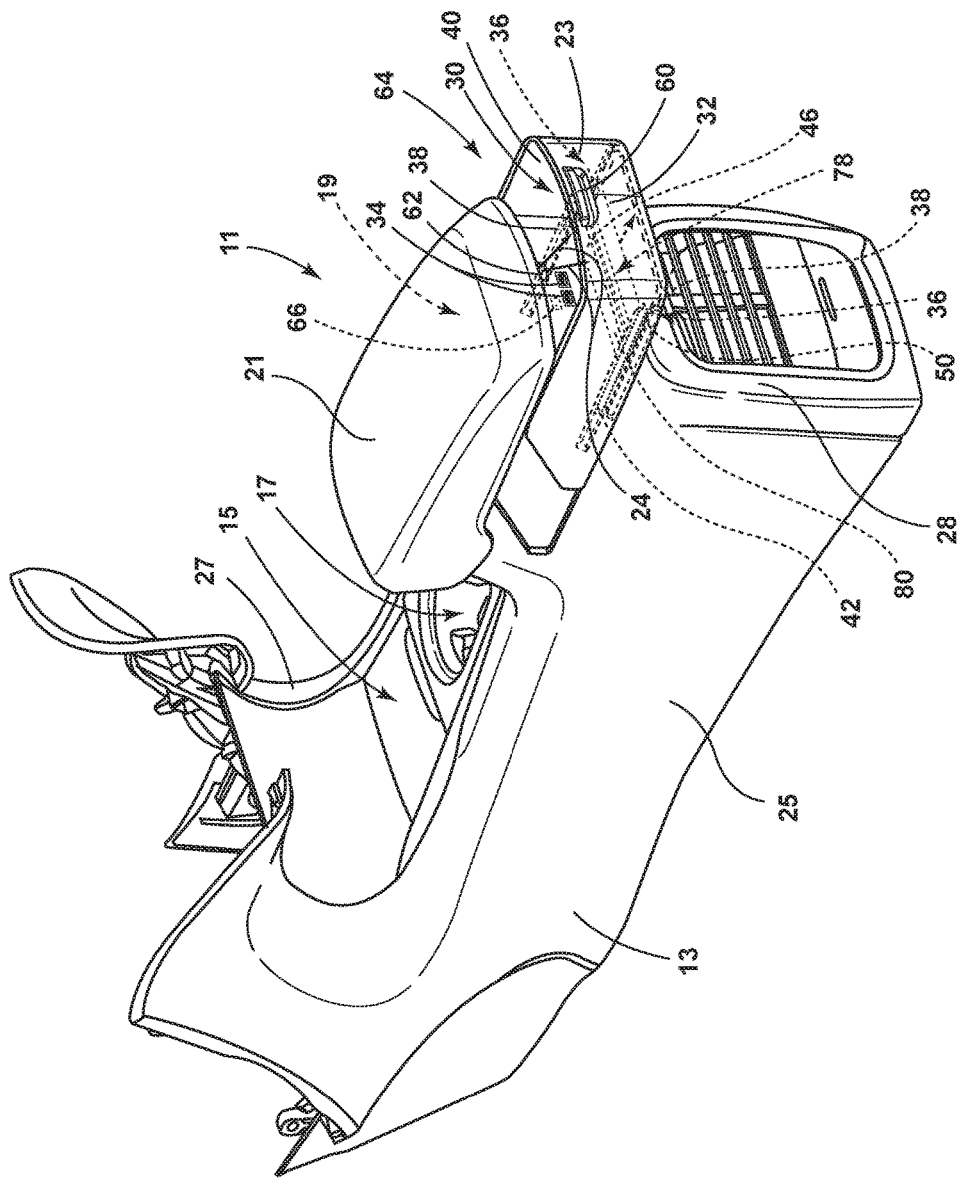
FIG. 10 is a rear perspective view of the storage compartment having a movable substrate with the member in a first open position, according to some examples.

Referring to FIG. 9, the luminescent structure 10 may be disposed on and/or integrated within the substrate 46. In some examples, the light source 62 may emit excitation light that causes the substrate 46 to luminesce. In some examples, the controller 66 may be configured to adjust a color of the converted light 26 by sending control signals to adjust an intensity or energy output level of the light source 62. For example, if the light source 62 is configured to output the emitted light 24 at a low level, substantially all of the emitted light 24 may be converted to the outputted, visible converted light 26. If the light source 62 is configured to emit emitted light 24 at a high level, only a portion of the emitted light 24 may be converted to the converted light 26 by the luminescent structure 10. In this configuration, a color of light corresponding to mixture of the emitted light 24 and the converted light 26 may be output as the outputted light. In this way, the controller 66 may control an output color of the outputted light.

Though a low level and a high level of intensity are discussed in reference to the emitted light 24, it shall be understood that the intensity of the emitted light 24 may be varied among a variety of intensity levels to adjust a hue of the color corresponding to the emitted excitation and/or converted light 24, 26 from the storage compartment 30.

As described herein, the color of the converted light 26 may be dependent on the particular luminescent material 18 utilized in the luminescent structure 10. Additionally, a conversion capacity of the luminescent structure 10 may be significantly dependent on a concentration of the luminescent materials 18 utilized in the luminescent structure 10. By adjusting the range of intensities that may be emitted from the light source 62, the concentration and proportions of the luminescent materials 18 in the luminescent structure 10 and the types of luminescent materials 18 utilized in the luminescent structure 10 discussed herein may be operable to generate a range of color hues of outputted light by blending the emitted light 24 with the converted light 26. It is also contemplated that the intensity of each light source 62 may be varied simultaneously, or independently, from any number of another light source 62.

Referring to FIGS. 10-13, the substrate 46 may be configured as a tambour substrate 78 that includes a plurality of latitudinally extending slats 80 that are hingedly coupled to one another. The tambour substrate 78 is fixedly attached to the rear portion of the member 23 on a first end portion thereof and disposed within the housing 13 on a second end portion. The substrate 46 in the illustrated example may be opened and closed by sliding the member 23 between the closed and the open positions. When closed, the tambour substrate 78 is at least partially disposed within the housing 13 and may pass through or into a portion of the housing 13. As provided herein, the substrate 46 may slide within guides 50 defined by one or more interior surfaces 40 of the member 23. In general, the tambour substrate 78 may be made of an injection moldable plastic material, which may be assembled in any suitable conventional manner, such as via fasteners, adhesives, welding, and so forth. Moreover, the tambour substrate 78 may be formed from any suitable material, such as a molded plastic, a hard material, a flexible material, and so forth. Additionally, the tambour substrate 78 may be wrapped in a material, such as leather, vinyl, or fabric. In some embodiments, the tambour substrate 78 may include a foam to provide passenger comfort. In some examples, the slats 80 may be magnetically attracted to one another. The slats 80 may be configured form an opaque material, a translucent material, or a transparent material without departing from the scope of the present disclosure.

Figure 11:
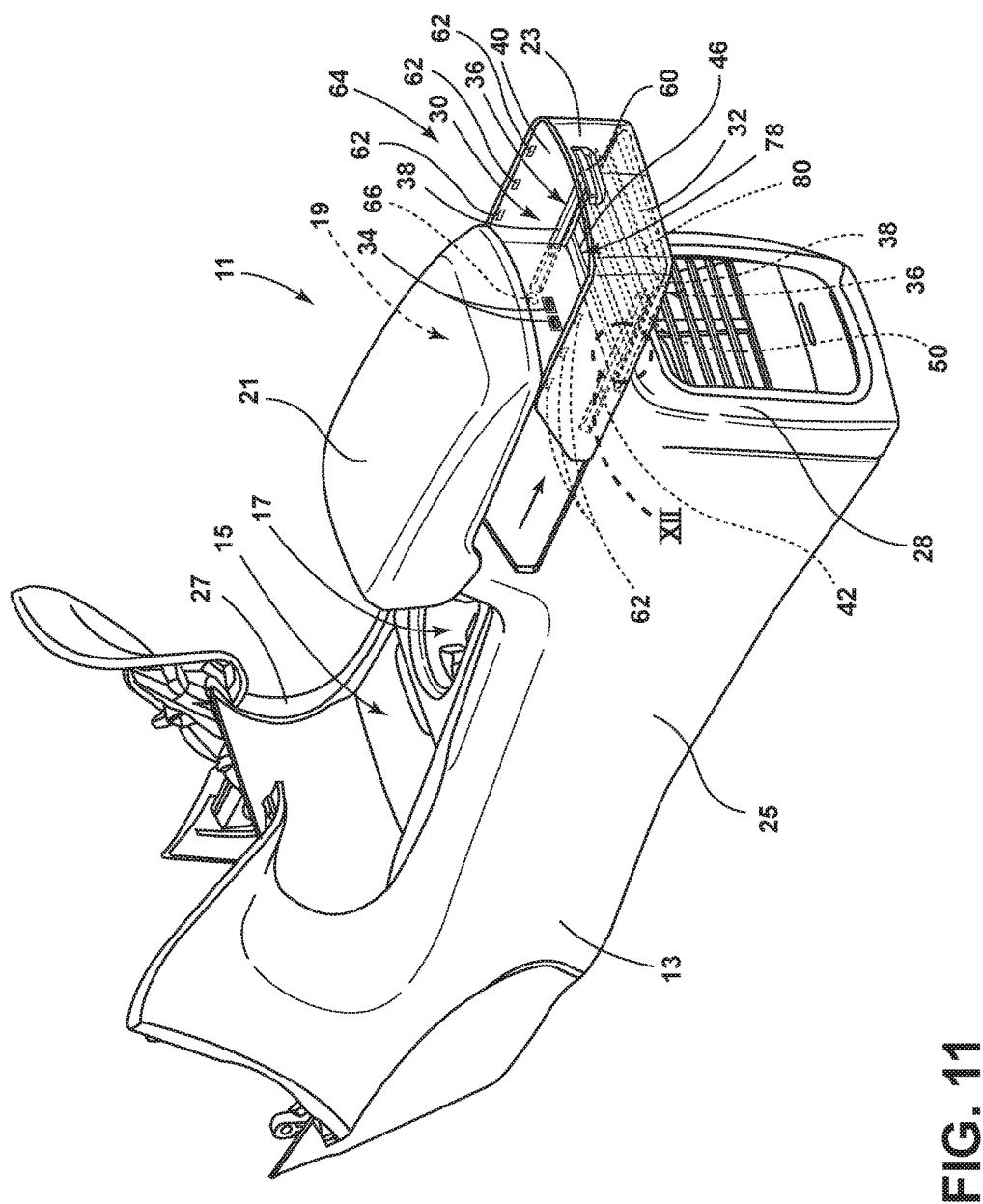
FIG. 11 is a rear perspective view of the storage compartment having a plurality of light sources on the member with the member in a second open position, according to some examples.

As illustrated in FIG. 11, the light source 62 may be configured as a plurality of light sources 62 disposed on an interior surface 40 of the member 23 and directed towards the storage compartment 30. In such instances, the light source 62, or the plurality of light sources 62, may provide ambient lighting within the storage compartment 30 when the member 23 is disposed in the open position. When the member 23 is disposed in the closed position, the light source 62 may provide ambient lighting around the housing 13, which may also be emitted into a footwell area of the vehicle.

Figure 12:
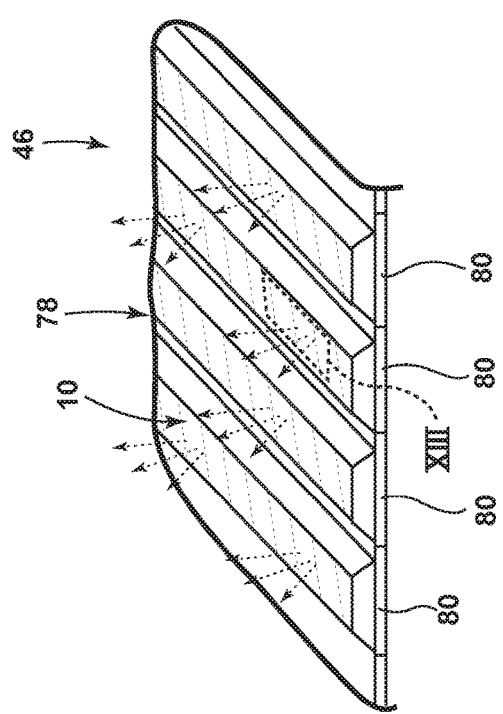
FIG. 12 is a partial perspective view of the substrate, according to some examples.
Figure 13:
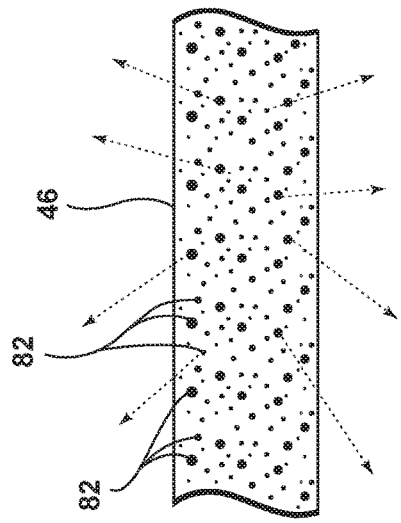
FIG. 13 is a top view of area XIII of FIG. 12, according to some examples.

Referring to FIGS. 12 and 13, the slats 80 of the tambour substrate 78 may include the luminescent material 18 therein and/or thereon. Accordingly, when the light source 62 is activated, the slats 80 may luminesce and provided ambient lighting to the storage compartment 30. In some examples, the slats 80 may incorporate a long-persistence luminescent material 18 such that the slats 80 may continue to luminesce for a period of time after the light source 62 is deactivated.

In some examples, the light source 62 may include a plurality of light sources 62 that are disposed proximate the guides 50 of the member 23. Moreover, the slats 80 may be translucent and/or otherwise direct light therethrough. The slats 80 may include laser etchings 82 thereon that refract the light emitted by the light sources 62. In some examples, the slats 80 may be disposed in an alternating upward and downward orientation such that the light sources 62 provide illumination within the storage compartment 30 and/or beneath the storage compartment 30.

A variety of advantages may be derived from the use of the present disclosure. For example, use of the disclosed lamp system provides a unique aesthetic appearance to the vehicle. Moreover, the storage assembly may add additional storage compartments to a vehicle compartment. The storage assembly may employ a light source for illuminating the storage compartment and/or a footwell area of the vehicle. The storage assembly may be manufactured at low costs when compared to standard vehicle storage assemblies.

According to various examples, a storage assembly is provided herein. The storage assembly includes a console housing defined by a plurality of surfaces. A member extends along at least one of the plurality of surfaces and is movable along the console housing between a closed position and an open position. The member defines a storage compartment in the open position. Examples of the storage assembly can include any one or a combination of the following features:
 the console housing is disposed between a driver seat and a passenger seat and the member extends along a pair of side surfaces and a rear surface of the housing;
 a substrate defining a bottom surface of the storage compartment, the substrate expandable as the member is moved between the open and closed positions;
 the substrate is wound about a spool, the spool disposed within the storage compartment;
 a track assembly operably coupling the member to the console housing;
 the track assembly includes a channel defined by the member and a retaining feature extending from the console housing is disposed within the channel;
 a damper operably coupled to the member and the console housing;
 a light source configured to direct emitted light into the storage compartment;
 a switch operably coupled to the member and configured to detect a position of the member;
 a luminescent structure disposed on a substrate and configured to luminesce in response to receiving emitted light;
 the switch includes a capacitive sensor; and/or
 a light guide optically coupled to the light source and disposed along a rear surface of the console housing.

Moreover, a method of manufacturing a storage assembly is provided herein. The method includes forming a console housing defined by a plurality of surfaces. A member is coupled to the housing that extends along at least one of the plurality of surfaces and is movable along the console housing between a closed position and an open position. The member defines a storage compartment in the open position.

According to some examples, a storage assembly is provided herein. The storage assembly includes a member movable along a console housing between a closed position and an open position. The member defines a storage compartment in the open position. A substrate defines a bottom surface of the storage compartment. The substrate is expandable as the member is moved between the open and closed positions. Examples of the storage assembly can include any one or a combination of the following features:
 a light source configured to direct emitted light into the storage compartment;
 the substrate is wound about a spool, the spool disposed within the storage compartment; and/or
 a switch operably coupled to the member and configured to detect a position of the member.

According to other examples, a vehicle storage assembly is provided herein. The vehicle storage assembly includes a member movable along a console housing between a closed position and an open position. The member defines a storage compartment in the open position. A substrate defines a bottom surface of the storage compartment. The substrate is expandable as the member is moved between the open and closed positions. A light source is configured to illuminate the storage compartment in the open position. Examples of the vehicle storage assembly can include any one or a combination of the following features:
 the substrate is configured as a tambour substrate that includes a plurality of latitudinally extending slats that are hingedly coupled to one another;
 a track assembly operably coupling the member to the console housing;
 a light guide optically coupled to the light source and disposed along a rear surface of the console housing.

It will be understood by one having ordinary skill in the art that construction of the described invention and other components is not limited to any specific material. Other exemplary examples of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable and/or physically interacting components and/or wirelessly interactable and/or wirelessly interacting components and/or logically interacting and/or logically interactable components. Furthermore, it will be understood that a component preceding the term "of the" may be disposed at any practicable location (e.g., on, within, and/or externally disposed from the vehicle) such that the component may function in any manner described herein.

It is also important to note that the construction and arrangement of the elements of the invention as shown in the exemplary examples is illustrative only. Although only a few examples of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary examples without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A storage assembly for a vehicle comprising:
a console housing defined by a plurality of surfaces;
a member extending along at least one of the plurality of surfaces and movable along the console housing between a closed position and an open position, wherein the member defines a storage compartment in the open position; and
a substrate defining a bottom surface of the storage compartment and wound about a spool, the spool disposed within the storage compartment, the substrate expandable as the member is moved between the open and closed positions.

2. The storage assembly for a vehicle of claim 1, wherein the console housing is disposed between a driver seat and a passenger seat and the member extends along a pair of side surfaces and a rear surface of the housing.

3. The storage assembly for a vehicle of claim 1, further comprising:
a track assembly operably coupling the member to the console housing.

4. The storage assembly for a vehicle of claim 3, wherein the track assembly includes a channel defined by the member and a retaining feature extending from the console housing is disposed within the channel.

5. The storage assembly for a vehicle of claim 1, further comprising:
a damper operably coupled to the member and the console housing.

6. The storage assembly for a vehicle of claim 1, further comprising:
a light source configured to direct emitted light into the storage compartment.

7. The storage assembly for a vehicle of claim 1, further comprising:
a switch operably coupled to the member and configured to detect a position of the member.

8. The storage assembly for a vehicle of claim 6, further comprising:
a luminescent structure disposed on a substrate and configured to luminesce in response to receiving emitted light.

9. The storage assembly for a vehicle of claim 7, wherein the switch includes a capacitive sensor.

10. The storage assembly for a vehicle of claim 6, further comprising:
a light guide optically coupled to the light source and disposed along a rear surface of the console housing.

11. A storage assembly comprising:
a member movable along a console housing between a closed position and an open position, wherein the member defines a storage compartment in the open position; and
a substrate defining a bottom surface of the storage compartment and wound about a spool, the spool disposed within the storage compartment, the substrate expandable as the member is moved between the open and closed positions.

12. The storage assembly of claim 11, further comprising:
a light source configured to direct emitted light into the storage compartment.

13. The storage assembly of claim 11, further comprising:
a switch operably coupled to the member and configured to detect a position of the member.

14. A vehicle storage assembly comprising:
- a member movable along a console housing between a closed position and an open position, wherein the member defines a storage compartment in the open position;
- a substrate defining a bottom surface of the storage compartment and configured as a tambour substrate that includes a plurality of latitudinally extending slats that are hingedly coupled to one another, the substrate expandable as the member is moved between the open and closed positions; and
- a light source configured to illuminate the storage compartment in the open position.

15. The vehicle storage assembly of claim 14, further comprising:
- a track assembly operably coupling the member to the console housing.

16. The vehicle storage assembly of claim 14, further comprising:
- a light guide optically coupled to the light source and disposed along a rear surface of the console housing.

\* \* \* \* \*